United States Patent [19]

Mishra

[11] 4,288,584

[45] Sep. 8, 1981

[54] ELECTRET MADE OF BRANCHED ALPHA-OLEFIN POLYMER

[75] Inventor: Anupama Mishra, Guelph, Canada

[73] Assignee: Uniroyal Ltd., Ontario, Canada

[21] Appl. No.: 955,822

[22] Filed: Oct. 30, 1978

[30] Foreign Application Priority Data

Aug. 10, 1978 [CA] Canada ................................. 309053

[51] Int. Cl.³ .................... C08F 110/14; H01G 7/02
[52] U.S. Cl. .................................. 526/348.4; 307/400; 526/348.6
[58] Field of Search ..................... 307/400; 526/348.4, 526/348.6

[56] References Cited

U.S. PATENT DOCUMENTS

| | | | |
|---|---|---|---|
| 3,632,443 | 1/1972 | Kodera et al. | 427/12 |
| 3,645,995 | 2/1972 | Caunt | 526/348.6 |
| 3,660,736 | 5/1972 | Igarashi et al. | 307/400 |

OTHER PUBLICATIONS

Polymerization Processes, Schildknecht & Skeist, Wiley Interscience, N.Y. (1977) pp. 395–399.

*Primary Examiner*—Stanford M. Levin
*Attorney, Agent, or Firm*—James J. Long

[57] ABSTRACT

A stable electret made of a resinous polymer of a branched alpha-olefin [e.g., poly(4-methyl-1-pentene)] having a degree of crystallinity of at least 20%.

5 Claims, No Drawings

ELECTRET MADE OF BRANCHED ALPHA-OLEFIN POLYMER

This invention relates to an electret made of a branched alpha-olefin polymer.

An electret may be defined as a permanently polarized dielectric material. In more detail it may be described as a dielectric material that has been subjected to a sufficiently intense electrostatic field to produce a residual internal polarization that persists after the field is removed. An electret may be regarded as an electrostatic equivalent of a permanent magnet.

It has previously been known to make electrets from various polymers. Of the various polymers that have been proposed only the fluoropolymers have been found to give rise to stable electrets that can be employed profitably for practical applications. Fluoropolymers are, however, not very common materials and since special techniques are required for their preparation and processing, they are also very costly.

More common polymers such as polyesters, polycarbonates, etc. can be formulated initially as highly charged electrets but these charges are short-lived especially under humid conditions. Thus, such electrets are not suitable for practical applications.

It has also been proposed to make electrets from simple polyolefins such as polyethylene and polypropylene (see, for example, U.S. Pat. No. 3,632,443, Kodera et al., Jan. 4, 1972). Unfortunately, such electrets are not very stable.

Unexpectedly, however, it has now been discovered in accordance with the present invention that a stable electret can be obtained from a resinous polymer of an alpha-olefin having a branched side chain which polymer has a degree of crystallinity of at least 20% and is composed of repeating units having the structure

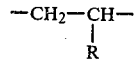

where R is a branched alkyl radical having from 3 to 10 carbon atoms. These polymers possess better physical properties than the fluoropolymers, making them quite versatile for commercial applications.

The invention is accordingly based on the unexpected discovery that introducing branched sidechains such as isopropyl, isobutyl, etc., into an alpha-olefin polymer structure improves the electret stability greatly, and the final polymers possess as good electret stabilities as fluoropolymers [e.g., poly(tetrafluoroethylene-co-hexafluoropropylene), etc.]. Further, it has been found that another important feature is the crystallinity of the polymer. Amorphous polyolefin materials are not good electret materials. The polyolefin materials employed in this invention have isotatic structures; they have a high degree of crystallinity in the bulk, as-prepared state, and processing further increases the degree of crystallinity. For purposes of the invention the degree of crystallinity after processing should be at least 20%.

Among the polymers suitable for use in the invention there may be mentioned by way of non-limiting example poly(3-methyl-1-butene), poly(4-methyl-1-pentene), poly(4-ethyl-1-pentene), poly(4,4-dimethyl-1-pentene), poly(4,4-dimethyl-1-hexene), etc.

The crystallinity of the polymers suitable for use in the invention may be determined by any suitable conventional method such as infrared spectroscopy, density, X-ray diffraction, etc.; as indicated, polymers having a crystallinity of at least 20% by weight are employed.

While it is not desired to limit the invention to any particular theory of operation, it is believed that the improved stability of the electrets of the invention may be attributable at least in part to the action of the branched side chains in stiffening the main molecular chain.

Methods of making the polymers suitable for use in the invention are well-known. The polymer should be essentially free from impurities which could increase its conductivity (notably surface active antistatic agents) and the polymer should not be subjected to any treatment which might increase its electrical conductivity (e.g., exposure to gamma-rays, ultraviolet irradiation, pyrolysis, etc.)

The branched monoolefin polymer is ordinarily provided in the form of a film or sheet (e.g., 1 to 1000 mil thickness) for conversion into an electret. The electret may be formed by any known conventional method for charging or polarizing electrets. Thus, the electret may be charged by injection of charged particles (injected space-charge formation). This involves applying high voltage (about 20 to 60 KV for 1 to 5 minutes) across the sheet to create an ionized plasma at room temperature or at any elevated temperature below the softening temperature of the polymer) whereby a charge is injected under the influence of the electrical field, and subsequently (after cooling to room temperature if elevated temperature has been used) removing the field, whereby a space-charge homoelectret consisting of the herein-described branched polymer is formed. It will be understood that the term "homoelectret" refers to an electret in which the surface facing the positive electrode develops a positive charge and the surface facing the negative electrode develops a negative charge. (In a dipole-oriented heteroelectret or in an internal space-charge heteroelectret the opposite is true.) Films or sheets for making the electrets may be formed from the described polymers by any suitable conventional method, such as compression molding.

To make an electret, the polymer film may be cut and placed inside a square plastic frame (5.7×5.7 cm). This frame is then set on a glass plate (5 mm thick) resting on a grounded metal plate (polymer film facing up). Another glass plate 5 mm thick is placed over the polymer film; this second glass plate has a coating of evaporated aluminum on the top which is connected to the negative terminal of a DC power supply. A charging voltage of 30 KV is applied for 1 minute at room temperature. After being thus charged the electret is wrapped with an aluminum foil to remove excess charge. The stable practical charge remaining may then be measured and evaluated by well-known techniques based on the fact that the charge in the electret produces an electrical field external to itself, which may be characterized by the expression "equivalent surface charge" or "apparent surface charge density." The measurement methods used work mostly on the principle of induction, though other methods such as torsion balance and related force meters can also be applied to find the force between the electret and an electrode.

The apparent surface charge density of the electret may be measured [see Reedyk et al, J. Electrochem. Soc. 115, 49 (1968)] by placing the electret between a fixed electrode and an electrode rotating in the surface field of the electret (a chopper electrode) to produce an AC signal. A bias voltage is then applied across the rotating and fixed electrodes sufficient to produce a zero output signal. The apparent surface charge density in coulombs per square centimeter is equal to $$(KEV)/d$$

where K is the dielectric constant of the electret material [2.12 for poly(4-methyl-1-pentene)], E is the permittivity of the free space ($8.854 \times 10^{-14}$ faraday/cm), V is the externally applied bias voltage for null signal, and d is the thickness of the film in cm. For a particular electret, K, E and d are constant, making the apparent surface charge density directly proportional to the null bias voltage, V.

The stability of the electret may be evaluated by determining the apparent surface charge density of the electret (or, simply, the null bias voltage which is proportional thereto as just described) repeatedly over a period of time, in electrets that have been subjected to various environmental conditions over the period of the tests. In this way the ability of the electret to retain a charge over a long period of time, at room temperature and at elevated temperature, and under conditions of low and high humidity, can be determined.

It has surprisingly been found that the present electrets made from the described branched, crystalline polymers are stable over wide variations of temperature and humidity. The electrets of the invention show stabilities very similar to the well-known polyfluoroolefin electrets and in addition the present electrets have the advantages of lower cost, ease of fabrication and useful mechanical properties, particularly hardness, flexural strength, rigidity, etc., making the present electrets more versatile than those currently used.

The electrets can be laminated but require no lamination to another polymer and find applications as the electrostatic element in electro-acoustic devices such as microphones, headphones and speakers and in dust particle control, high voltage electrostatic generators, electrostatic recorders and other applications.

The following examples will serve to illustrate the practice of the invention in more detail.

EXAMPLE 1

Poly(4-methyl-1-pentene)polymer, having degrees of crystallinity of 40 to 60%, crystalline melting point of 240° C., and commercially available under the trademark TPX, is compression molded into films about 20 mils thick. The polymer film is cut and placed inside a square plastic frame (5.7×5.7 cm). Each frame is then set on a glass plate (5 mm thick) resting on a grounded metal plate (polymer film facing up). Another glass plate 5 mm thick is placed on the polymer film; this second glass plate has a coating of evaporated aluminum on the top which is connected to the negative terminal of a DC power supply. A charging voltage of 30 KV is applied for 1 minute at room temperature. After being thus charged the electret is wrapped with an aluminum foil to remove excess charge. A number of electrets prepared in this manner are tested for charge decay periodically over a time of 310 days under various conditions as follows:

22° C. at 98% relative humidity
50° C. dry
50° C. at 100% relative humidity

The charge is measured by the method of Reedyk et al. as described above and reported as an observed bias voltage, with the results shown in Table 1.

TABLE 1

Charge Decay Characteristics of Poly(4-methyl-1-pentene) (TPX) Electrets Under Various Environmental Conditions

| Time in Days | 22° C. At 98% Rel. Humidity | | 50° C. Dry | | 50° C. at 100% Rel. Humidity | |
|---|---|---|---|---|---|---|
| | Bias Volt. | Rel. Ratio | Bias Volt. | Rel. Retio | Bias Volt. | Rel. Ratio |
| 0 | 1340 | 1.00 | 1590 | 1.00 | 1390 | 1.00 |
| 1 | 1340 | 1.00 | 1510 | 0.95 | 1450 | 1.04 |
| 15 | 1230 | 0.92 | 1530 | 0.96 | 1380 | 0.99 |
| 29 | 1090 | 0.81 | 1540 | 0.97 | 1320 | 0.95 |
| 57 | 1000 | 0.75 | 1540 | 0.97 | 1250 | 0.90 |
| 111 | 920 | 0.69 | 1520 | 0.96 | 1170 | 0.84 |
| 204 | 980 | 0.73 | 1520 | 0.96 | 1020 | 0.73 |
| 265 | 950 | 0.71 | 1490 | 0.94 | 1060 | 0.76 |
| 310 | 990 | 0.74 | 1480 | 0.93 | 940 | 0.68 |

The data in Table 1 demonstrate that the electrets of the invention made of poly(4-methyl-1-pentene) polymer having high crystallinity are remarkably stable and hold a substantial portion of their charge for a long period of time even when subjected to high humidity and elevated temperature. The charge decay characteristics of the electrets of the invention compare favorably with those of electrets similarly prepared from 20 mils thick films of commercial poly(tetrafluoroethylene-co-hexafluoropropylene) (Teflon FEP, Type A; trademark), which is considered to be one of the best commercial electret materials, as shown in Table 2.

TABLE 2

Charge Decay Characteristics of Teflon FEP Electrets

| Time in Days | 22° C., 100% Relative HUmidity | | 50° C., 100% Relative Humidity | |
|---|---|---|---|---|
| | Bias Volt. | Rel. Ratio | Bias Volt. | Rel. Ratio |
| 0 | 1630 | 1.00 | 1550 | 1.00 |
| 1 | 1600 | 0.98 | 1530 | 0.99 |
| 15 | 1500 | 0.92 | 1470 | 0.95 |
| 29 | 1400 | 0.86 | 1420 | 0.92 |
| 43 | 1400 | 0.86 | 1430 | 0.92 |
| 111 | 1350 | 0.83 | 1430 | 0.92 |
| 174 | 1400 | 0.86 | 1390 | 0.90 |
| 230 | 1300 | 0.80 | 1350 | 0.87 |

Polyethylene films of about 15 mils thickness, prepared by compression molding of commercial polyethylenes of various densities, yield inferior electrets from the standpoint of charge stability at elevated temperature and/or high humidity, as shown in Tables 3 and 4.

TABLE 3

Charge Decay Characteristics of Electrets from Polyethylenes of Various Densities at 50° C./100% Relative Humidity

| Time in Days | Polyethylene Density 0.960 | | Polyethylene Density 0.950 | | Polyethylene Density 0.945 | |
|---|---|---|---|---|---|---|
| | Bias Volt. | Rel. Ratio | Bias. Volt. | Rel. Ratio | Bias. Volt. | Rel. Ratio |
| 0 | 2000 | 1.00 | 1100 | 1.00 | 1800 | 1.00 |
| 1 | 1200 | 0.60 | 250 | 0.23 | 300 | 0.17 |
| 4 | 1050 | 0.53 | 200 | 0.18 | 100 | 0.06 |
| 29 | 880 | 0.44 | — | — | — | — |
| 75 | 700 | 0.35 | — | — | — | — |
| 110 | 500 | 0.25 | — | — | — | — |

TABLE 4

Charge Decay Characteristics of Electrets from Polyethylenes of Various Densities at 22° C. and 100% Relative Humidity

| Time in Days | Polyethylene Density 0.960 | | Polyethylene Density 0.950 | | Polyethylene Density 0.945 | |
|---|---|---|---|---|---|---|
| | Bias Volt. | Rel. Ratio | Bias Volt. | Rel. Ratio | Bias Volt. | Rel. Ratio |
| 0 | 1900 | 1.00 | 1300 | 1.00 | 1700 | 1.00 |
| 1 | 1600 | 0.84 | 1050 | 0.81 | 1550 | 0.91 |
| 4 | 1430 | 0.75 | 850 | 0.65 | 1500 | 0.88 |
| 44 | 1000 | 0.53 | 450 | 0.35 | 1150 | 0.70 |
| 79 | 900 | 0.47 | 410 | 0.31 | 1050 | 0.62 |
| 250 | 500 | 0.26 | 180 | 0.14 | 400 | 0.24 |

The results obtainable with the poly(4-methyl-1-pentene) electrets of the invention are not obtainable with linear alpha-olefins such as polypropylene, isotactic poly(1-butene), or isotactic poly(1-hexadecene) as shown by Table 5 which gives data obtained on electrets made of 15 mil thick compression molded film of three linear alpha-olefins.

TABLE 5

Charge Decay Characteristics of Electrets Derived From Isotactic Polypropylene, Poly(1-butene) and Poly(1-hexadecene) at 22° C./100% Relative Humidity

| Time in Days | Isotactic Polypropylene | | Isotactic Poly(1-butene) | | Isotactic Poly(1-hexadecene) | |
|---|---|---|---|---|---|---|
| | Bias Volt. | Rel. Ratio | Bias Volt. | Rel. Ratio | Bias Volt. | Rel. Ratio |
| 0 | 1900 | 1.00 | 1800 | 1.00 | 700 | 1.00 |
| 1 | 1500 | 0.80 | 435 | 0.24 | 250 | 0.36 |
| 7 | 1300 | 0.68 | 260 | 0.14 | 250 | 0.36 |
| 15 | 1270 | 0.67 | 200 | 0.11 | 130 | 0.19 |
| 21 | 1220 | 0.64 | 160 | 0.09 | 80 | 0.11 |
| 28 | 1210 | 0.64 | 150 | 0.08 | 60 | 0.09 |

EXAMPLE 2

Poly(3-methyl-1-butene) is prepared as follows:

In a 500 ml three-necked round bottom flask fitted with nitrogen inlet, reflux condenser and Teflon (trademark)-coated magnetic stirrer is placed 35 ml of purified petroleum ether of boiling point 80° to 120°. To this solution is added 5 ml of diethylaluminum chloride in 83 ml of petroleum ether (80°–120°) and 5 ml of alpha-TiCl$_3$ (grade AA) suspension [10 g of alpha-TiCl$_3$ in 100 ml of petroleum ether (80°–120°)] and the mixture is stirred at room temperature for fifteen minutes. 20 Ml of 3-methyl-1-butene is added to the catalyst suspension and polymerization is allowed to proceed for about 18 to 24 hours with continuous stirring in an atmosphere of dry nitrogen. The reaction mixture is treated with a solution of 50 ml 2,4-pentanedione in 100 ml of purified isopropanol. The resulting suspension is then heated at 80° for 2 hours and filtered. This treatment with 2,4-pentanedione-isopropanol is repeated and the final polymer in granular form is thoroughly washed with dry petroleum ether (80°–120°), and then freed of solvents in a vacuum oven at 60° C. for 12 hours. Films are obtained by pressing the polymer at a temperature of 270° C. at about 2000 psi of pressure for 8 minutes. The polymer has a high degree of crystallinity, as judged from its infrared spectrum.

Electrets are prepared from the poly(3-methyl-1-butene) in the same manner as described in Example 1, and tested for charge decay at 60° C. and 100% relative humidity, with the results shown in Table 6, wherein the electrets are seen to be highly stable.

TABLE 6

Charge Decay Characteristics of the Electrets from Poly(3-methyl-1-butene) under 100% Relative Humidity and 60° C.

| Time in Days | Bias Voltage | Relative Ratio |
|---|---|---|
| 0 | 1200 | 1.00 |
| 1 | 1200 | 1.00 |
| 7 | 1100 | 0.92 |
| 15 | 1080 | 0.90 |
| 22 | 1020 | 0.85 |
| 43 | 930 | 0.78 |
| 70 | 800 | 0.67 |
| 90 | 800 | 0.67 |

What is claimed is:

1. A homoelectret comprising an electrostatically polarized resinous polymer of an alpha-olefin having a branched side chain, said polymer being composed of repeating units having the structure

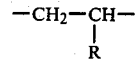

wherein R is a branched alkyl radical having from 3 to 10 carbon atoms, the said polymer having a crystallinity of at least 20% by weight.

2. A homoelectret as in claim 1 which is in the form of a film or sheet.

3. An electrostatic device in which the electrostatic element is a homoelectret as in claim 1.

4. A homoelectret as in claim 1 in which the said polymer is poly(4-methyl-1-pentene).

5. A homoelectret as in claim 1 in which the said polymer is poly(3-methyl-1-butene).

* * * * *